March 25, 1930.  T. G. MYERS  1,752,104
INDUCTION MOTOR WITH VARIABLE REACTANCE
Filed April 30, 1925  2 Sheets-Sheet 1
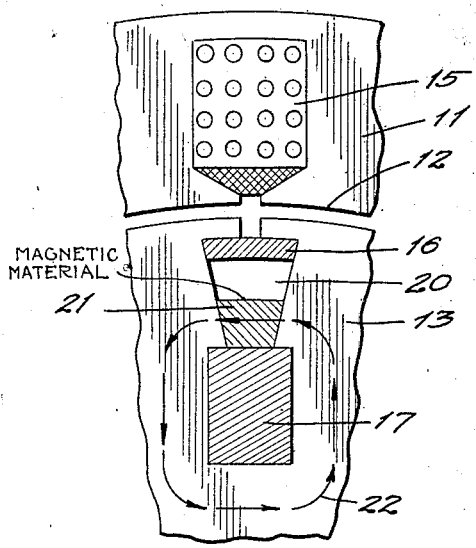
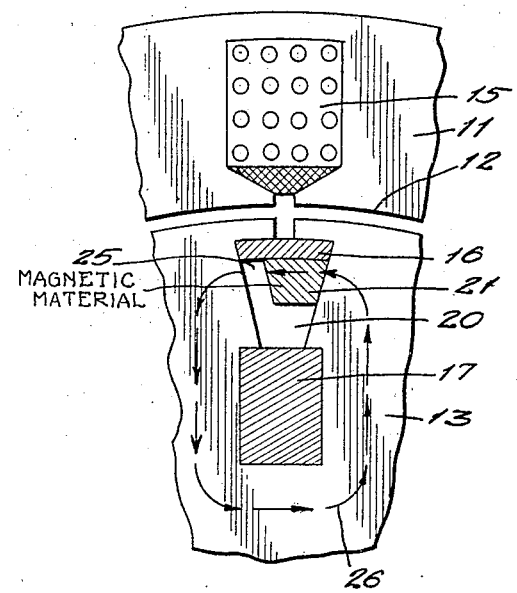
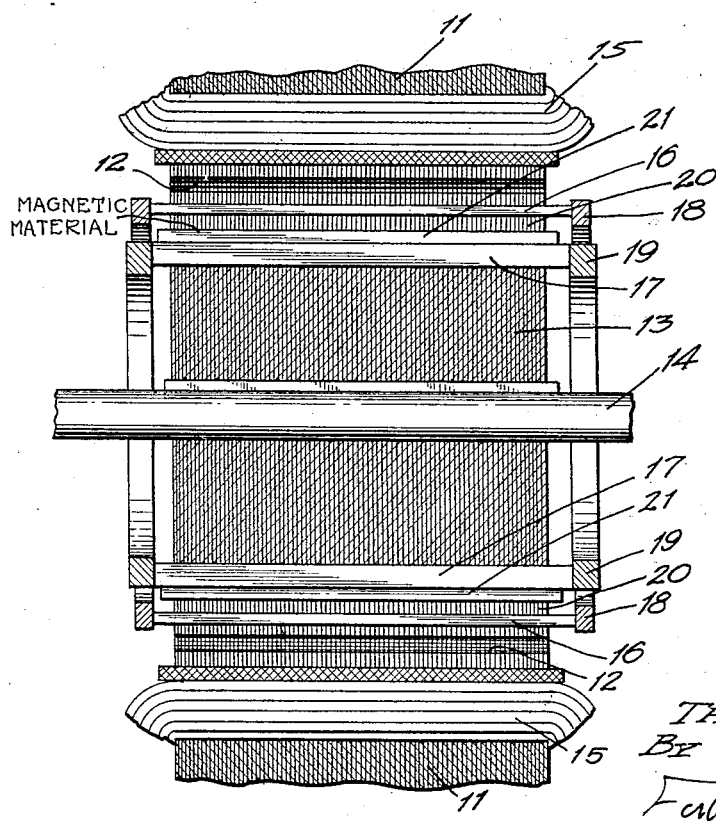
INVENTOR:
THOMAS G. MYERS,
BY
ATTORNEY.

March 25, 1930. T. G. MYERS 1,752,104
INDUCTION MOTOR WITH VARIABLE REACTANCE
Filed April 30, 1925 2 Sheets-Sheet 2
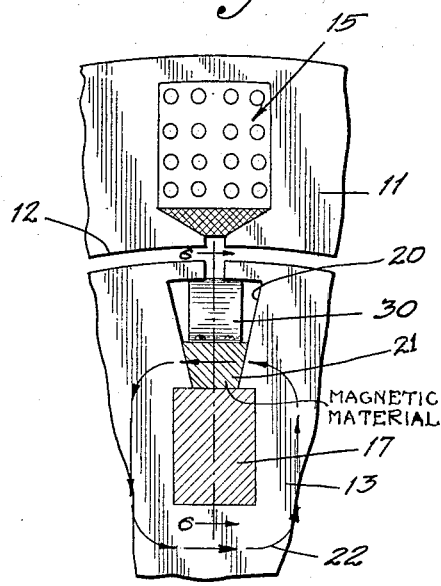
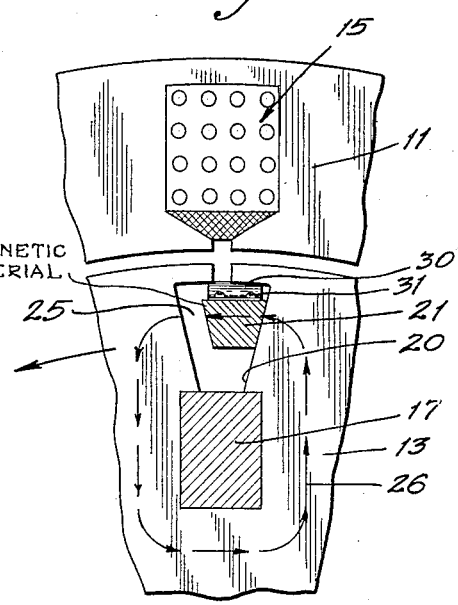
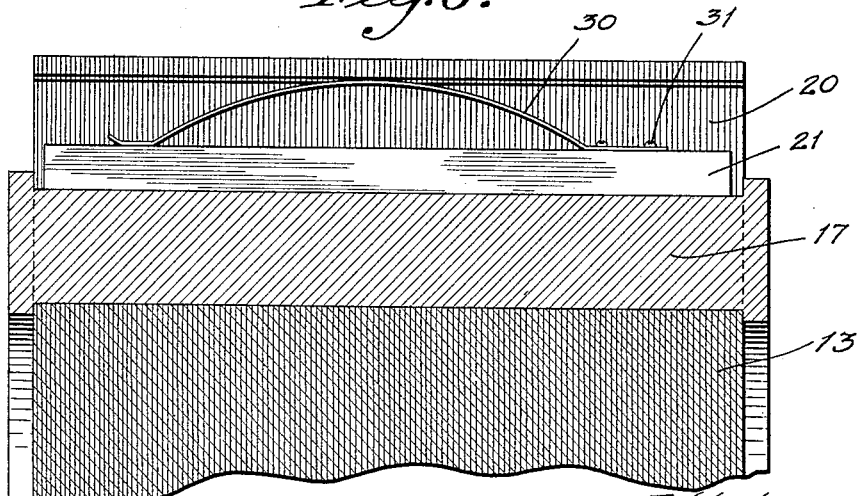
INVENTOR:
THOMAS G. MYERS,
BY
ATTORNEY.

Patented Mar. 25, 1930

1,752,104

UNITED STATES PATENT OFFICE

THOMAS G. MYERS, OF LOS ANGELES, CALIFORNIA, ASSIGNOR, BY MESNE ASSIGNMENTS, TO GENERAL ELECTRIC COMPANY, A CORPORATION OF NEW YORK

INDUCTION MOTOR WITH VARIABLE REACTANCE

Application filed April 30, 1925. Serial No. 26,890.

My invention relates to dynamo-electric machines such as induction motors and it may be conveniently applied to induction motors employing what are known as squirrel-cage secondaries.

The standard squirrel-cage induction motor comprises a stator made up of steel punchings having a central cylindrical bore and slots immediately adjacent to that bore, a primary winding being embedded in these slots. The primary winding is so disposed and so connected to an external polyphase electric source that a rotary magnetic field is set up thereby in the stator. The rotor is a cylindrical mass of steel punchings adapted to turn freely in the bore of the stator and mounted on a shaft suitably supported in bearings. The steel punchings of stator and rotor form a convenient, but not essential, embodiment of a magnetic circuit of high magnetic permeability. Near the periphery of the rotor slots are provided and a secondary winding is placed therein. In the standard squirrel-cage induction motor the secondary consists of electrical conducting bars disposed parallel to the axis of the rotor and in the slots about its periphery, these bars being joined at each end by electrically conducting end rings. The design of such squirrel-cage induction motors is well understood, and their use is very general throughout the world. They are efficient and low in first cost.

In designing such motors it is common for the designer to make certain compromises. For example, in a motor of five horsepower and below it is comparatively easy to so construct the motor that it will have excellent characteristics when running and can be sarted by connecting it directly to the source of current supply without the use of auxiliary devices other than a simple switch. This is possible since in these small motors it is possible to provide a motor having a sufficiently high reactance to hold the starting current within safe limits.

In the larger motors if the motor is made of sufficiently high reactance to hold the starting current within practical limits during starting the characteristics of the motor when running are impaired, the high reactance increasing the losses and lowering the power factor. For this reason it is common practice to provide such motors with auxiliary starting devices or "compensators" which prevent large currents at starting and which are cut out of circuit after the motor has accelerated sufficiently to make it safe to connect it directly to the line.

It is an object of my invention to provide a squirrel-cage induction motor which will have a high reactance when at rest and a low reactance when running and which can therefore be connected directly to the source of supply when starting, without compensator and without excessive current and which will have excellent characteristics when running.

My invention can also be applied to induction or synchronous generators or synchronous motors or to induction motors or generators having wound secondaries adapted to be connected through suitable slip rings with external reactance or resistance having, however, at present its principal application to squirrel-cage induction motors. It will, therefore, be described as applied to squirrel-cage induction motors, this being one embodiment only of the broader invention defined by the claims, other specific applications of the broad invention claimed being obvious to one skilled in the art.

Further objects and advantages will be made evident hereinafter.

The invention is illustrated in the drawings, in which:

Fig. 1 is a fragmentary cross sectional view of an induction motor comprising a stator surrounding a rotor, this view representing conditions at starting and before the rotor has been brought up to normal speed.

Fig. 2 is a view similar to Fig. 1, but represents conditions when the rotor is running at normal speed; and Fig. 3 is a fragmentary longitudinal section of the motor showing the complete rotor inside a portion of the stator.

Figs. 4 and 5 are views similar to Figs. 1 and 2 of a modification of my invention.

Fig. 6 is a partial section on a plane represented by the line 6—6 of Fig. 4.

In the form illustrated in Figs. 1, 2 and 3 the invention is shown as applied to what is known as a double cage secondary. If it is desired to build an induction motor, which can be connected directly to the line for starting purposes, especially if this motor is of over 5 H. P. capacity, it is quite essential that the starting current of the motor be reduced within safe limits. This may be done by connecting some sort of an impedance in circuit with the motor during starting or it can be accomplished by incorporating in the motor a sufficiently high impedance to prevent excessive currents. This impedance may consist of either resistance or reactance, or any combination thereof.

If the rotor is made with a sufficiently high resistance to prevent excessive starting current, the efficiency of the rotor will be low, since the heat losses in the rotor will be high both during starting and while the motor is running. If the reactance is made extremely high, the power factor of the motor both in starting and running will be impaired.

Previous inventors have sought to overcome the difficulties of this problem by providing the rotor with two squirrel-cage windings, one of which has a high resistance and low reactance, and the other of which has a low resistance and a high reactance.

In the form shown in Figs. 1 and 2, I provide a motor of this type in which 11 represents the stator punchings having a bore 12, inside which the rotor 13 is free to turn on a shaft 14 supported in suitable bearings, not shown. The stator 11 is provided with coils of a primary winding 15 so placed and connected as to set up a rotary field when connected to a suitable polyphase circuit. The rotor is provided with a high resistance squirrel-cage winding 16 and a high reactance squirrel-cage winding 17, the winding 16 consisting of bars connected by end rings 18, and the winding 17 consisting of bars connected by end rings 19.

The high resistance winding 16 is placed close to the periphery of the rotor and is so constructed that the reactance is very low. In starting the motor this winding is depended upon to give the necessary starting torque, the winding 17 being of so high a reactance that very little current flows therein during the starting period. During the starting period the frequency of the magnetic flux in the rotor is substantially the frequency of the supply circuit, but as the rotor is accelerated this frequency is reduced until at full load speed the rotor is turning a little below synchronous speed, at which the frequency would be low. Due to the great reduction in the frequency the reactance of the winding 17 is greatly reduced as the motor approaches full-load speed.

For the purpose of increasing the reactance during the starting period, I provide keystone or trapezoidal-shaped slots 20 between the windings 16 and 17 and place therein bars of magnetic material 21. These bars of magnetic material 21, when in the position shown in Fig. 1, tend to provide a magnetic path across the slot 20, the magnetic flux induced by the winding 17 travelling along a path 22 which may be substantially entirely through the magnetic material, as shown in Fig. 1; or it may have a small air gap due to the member 21 not fitting closely in the slot 20. By providing an almost entirely closed out path of high magnetic permeability the reactance of the winding 17 is extremely high and it is substantially ineffective at high frequency or during the starting period. During this period, as pointed out above, the winding 16 is depended upon to give the necessary starting torque, and this winding is made of sufficient electrical resistance to prevent excessive starting currents from flowing.

It is highly desirable however to reduce the reactance of the winding 17 after the motor has reached its normal speed, and I accomplish this by placing the members 21 loosely in the slot 20, this slot having the shape shown in Figs. 1 and 2. The members 21 are pulled into the position shown in Fig. 1 by the magnetic flux and tend to lie in this position due to the magnetic attraction. As the rotor accelerates, however, they are subjected to centrifugal forces which eventually throw them into the position shown in Fig. 2. In this position the members 21 are held by centrifugal force in the outer end of the slot 20 against the bars 16, and in this position a considerable air gap 25 is introduced into the magnetic path 26, this path 26 corresponding to the path 22 of Fig. 1. With the members 21 in the position shown in Fig. 2 the reactance of the winding 17 is quite small, and this winding therefore becomes effective to produce the running torque on the motor. By providing the member 21 in the slot 20, as shown, I am therefore able to provide a motor which has a high starting torque and a low starting current and which at the same time, when operating at normal speeds under load, has excellent characteristics.

My invention may be applied to a single cage rotor, as shown in Figs. 4 and 5, in which the outer or high resistance winding 16 is omitted. When used in this manner the high reactance of the winding 17 prevents excessive starting current due to the fact that the member 21 bridges the slot 25 and provides a low reluctance leakage path 22. As the motor accelerates the member 21 is thrown outwardly into the position shown in Fig. 5, thus reducing the reactance of the rotor.

I have found it advisable to provide flat springs 30 which are fastened as shown at 31 in Fig. 6 to the members 21, and which tend to hold the members 21 in the position shown in Fig. 4, until such time as the centrifugal force is sufficient to force them into the position shown in Fig. 5.

It will be noted that the member 21 virtually forms a portion of a leakage path between the primary winding 15 of the stator and the secondary winding 17 of the rotor. If this path is of low magnetic reluctance, as is the case with the member 21 in the position shown in Fig. 4, the leakage between the primary winding 15 and the secondary winding 17 will be very considerable and the reactance will be high. With the member 21 in the position shown in Fig. 5, the magnetic reluctance of this leakage path is very greatly increased. Thus, the movement of the member 21 varites the flux linkage paths between the windings 15 and 17. This movement also varies the flux linkage paths between the windings 15 and 16 by changing the reluctance of these paths.

Various modifications may be made without departing from the spirit of my invention. For example, the slots 20 and the bars 21 need not be trapezoidal as shown, but may be rectangular or of any other of a number of forms which may be readily designed, the slots and the bars being of similar or different shapes, and I desire it to be understood that such modifications and others which come within the scope of the appended claims are embraced by my present invention.

I claim as my invention:

1. An induction motor comprising a primary stator member and a secondary rotor member, the secondary member comprising a laminated magnetic core containing radial slots, a squirrel cage winding having bars located near the tops of said slots leaving slot spaces beneath said bars, such slot spaces being wider at the top than at the bottom, and radially movable magnetic wedges in such slot spaces, said wedges having a size and shape substantially conforming to the size and shape of the narrow portion of said slot spaces.

2. A rotor element for a dynamo electric machine comprising a magnetic core member and a pair of windings carried by said core member at different fixed radial positions therein, and means directly responsive to the speed of rotation of said rotor and solely inversely responsive to the flux therein for increasing the reluctance of the flux path between said windings.

3. A rotor element for a dynamo electric machine comprising a magnetic core member and a pair of windings carried by said core member at different fixed radial positions therein, said windings being separated by slot spaces, and radially freely movable magnetic wedges in said slot spaces arranged to be moved outwardly by centrifugal force dependent upon the speed of rotation of said element and inwardly solely by magnetic force dependent upon the flux of said member to vary the reluctance of the flux path between said windings.

4. A rotor element for a dynamo electric machine comprising a magnetic core member, a pair of windings carried therein at different fixed radial positions, said windings being separated by slot spaces, and radially freely movable magnetic wedges in said slot spaces for varying the reluctance of the flux path between said windings, the radial position of said wedges being dependent solely upon the differential effects of centrifugal and magnetic forces which are respectively proportional to the speed of rotation and magnetic flux of said rotor.

5. A rotor element for dynamo electric machines comprising a slotted magnetic core member, a winding in the bottoms of said slots and a winding in the tops of said slots, said windings being separated by slot spaces which converge toward the bottom winding, and radially freely movable magnetic bars in said slot spaces dimensioned to substantially fit into the narrow converging portion of said slot spaces.

6. A secondary rotor member for induction motors comprising a magnetic core member provided with radial slots, windings in the tops and bottoms of said slots separated by intervening slot spaces, radially freely movable magnetic wedges in said slot spaces adapted when moved from the bottom to the top of said slot spaces to materially increase the reluctance of the flux path between said windings, said wedges being moved to the bottoms of said slot spaces at starting by reason of a strong magnetic pull created by the rotor fluxes and moved to the tops of said slot spaces by reason of centrifugal force as the rotor accelerates.

7. A rotor member for dynamo electric machines comprising a core member provided with radial slots, a winding in the bottom of said slots, radially movable magnetic wedges in the slot spaces above said winding, the slot spaces adjacent to and above said winding being dimensioned with respect to the magnetic wedges so that the wedges fit therein to provide a low reluctance flux path across the slot above said winding, the fluxes of the rotor member serving to create magnetic forces tending to retain said wedges in the low reluctance positions against the action of centrifugal force.

In testimony whereof, I have hereunto set my hand at Los Angeles, California, this 24th day of April, 1925.

THOMAS G. MYERS.